United States Patent [19]

Fujimoto

[11] Patent Number: 4,776,017

[45] Date of Patent: Oct. 4, 1988

[54] DUAL-STEP SOUND PATTERN MATCHING

[75] Inventor: Junichiroh Fujimoto, Yokohama, Japan

[73] Assignee: Ricoh Company, Ltd., Tokyo, Japan

[21] Appl. No.: 857,838

[22] Filed: Apr. 30, 1986

[30] Foreign Application Priority Data

May 1, 1985 [JP] Japan ........................ 60-94143

[51] Int. Cl.$^4$ .................................. G10L 5/00
[52] U.S. Cl. .......................................... 381/43
[58] Field of Search ............... 381/42, 43; 364/513.5

[56] References Cited

U.S. PATENT DOCUMENTS

| | | | |
|---|---|---|---|
| 3,969,698 | 7/1976 | Bollinger et al. | 381/43 X |
| 4,516,215 | 5/1985 | Hakaridani et al. | 381/43 |
| 4,677,673 | 6/1987 | Ukita et al. | 381/43 |

Primary Examiner—Manuel S. Kemeny
Attorney, Agent, or Firm—Cooper & Dunham

[57] ABSTRACT

A sound or speech recognition system is made faster by first using data-reduced patterns to find candidates in preliminary testing, and then making a final decision by testing against full-data patterns. Specifically, a signal is transformed to a time-sequence of spectral vectors, which forms a full-data pattern. Then, a predetermined number of vectors representing the beginning or front-end of the signal are duplicated and summed to form a sum spectral vector which is used as the data-reduced pattern for preliminary testing.

9 Claims, 4 Drawing Sheets

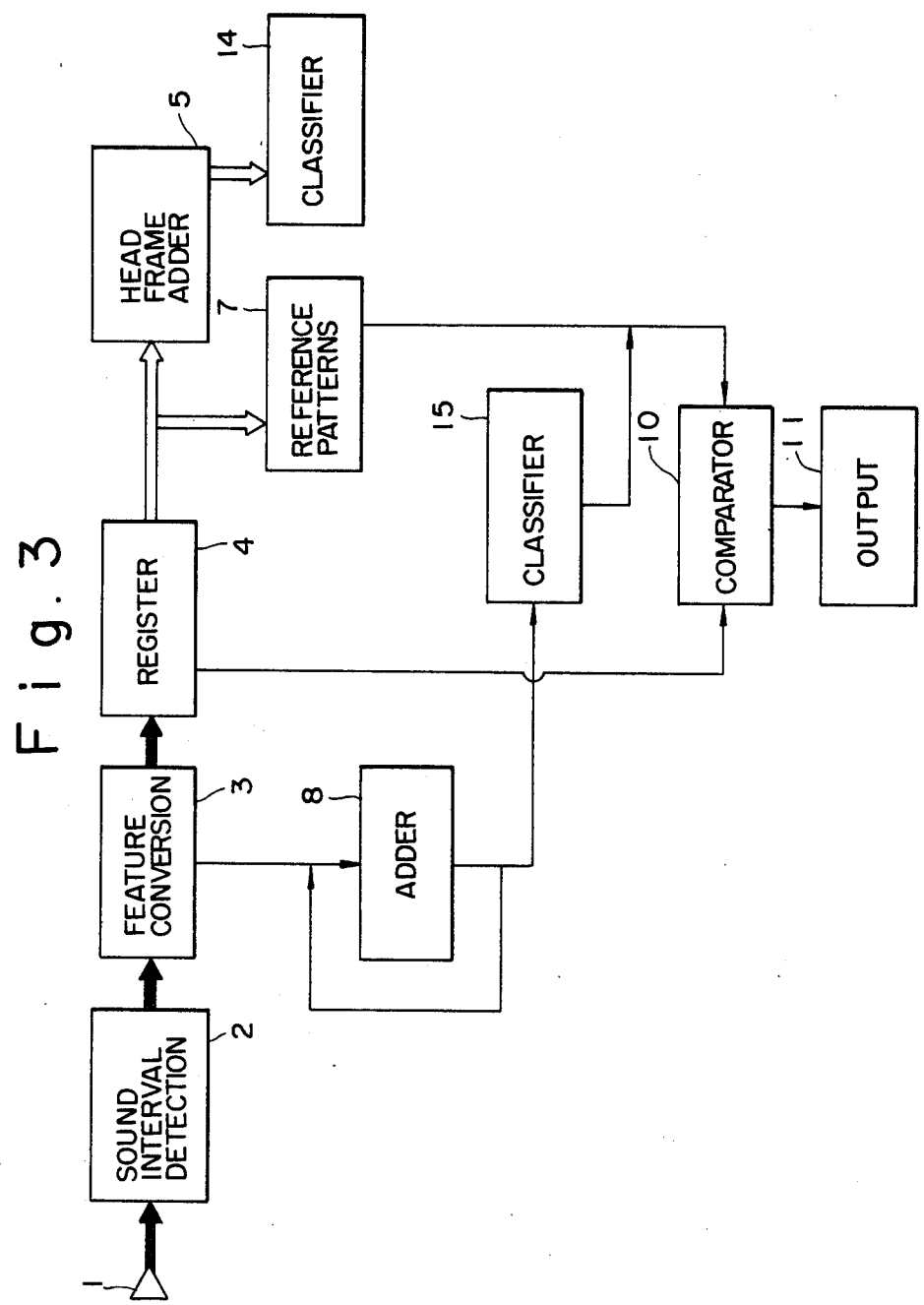

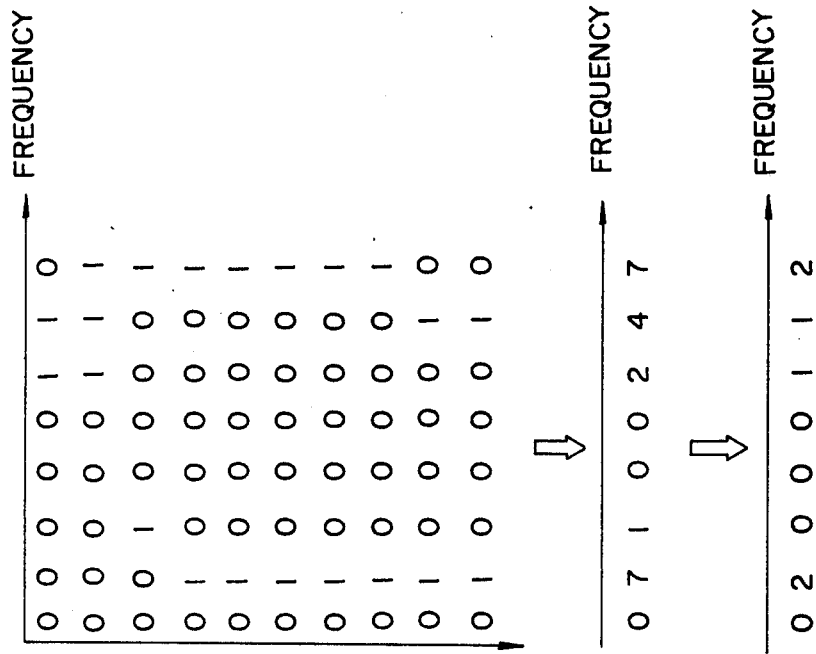

DUAL-STEP SOUND PATTERN MATCHING

BACKGROUND OF THE INVENTION

1. Field of the Invention

This invention relates to a sound identification or speech recognition technique, and, in particular, to a method and system for matching a sound or voice pattern.

2. Description of the Prior Art

In a speech recognition system, fast response is very important. If processing is initiated for identification of sound upon completion of inputting of the sound produced, the response becomes slow because it takes some time to process the sound data. Thus, it has been proposed to initiate the sound processing after inputting a certain amount of sound data as disclosed in the Japanese Patent Application No. 59-48333. According to the method disclosed in the above-identified application, upon inputting of sound data for a predetermined time interval from the beginning thereof, similar patterns are selected from reference patterns based on the sound data so far inputted, and, then, upon completion of inputting of the sound data, the entire sound data is compared with the selected similar patterns to find out which of the selected similar patterns matches best with the sound data inputted. However, if the number of the reference patterns becomes larger, it takes more time to carry out selection of similar patterns from the reference patterns, so that there is a possibility that the selection of similar patterns is still in progress even if the inputting of sound data has already been completed. Thus, the method disclosed in the above-identified application still needs to be improved in order for that method to be practically applicable.

SUMMARY OF THE INVENTION

In accordance with one aspect of the present invention, there is provided a method for identifying a sound, wherein, in advance, the sound data of each of various sounds for a predetermined time interval from the beginning thereof is added to form a single frame of reference pattern and the reference patterns for the various sounds are stored in a memory, and, then, when an unknown sound is inputted, this unknown sound is converted into a feature pattern whose front data are added to form a single frame of pattern to be matched in a manner similar to that for forming the reference patterns, whereby the pattern to be matched is compared with the stored reference patterns, thereby selecting those reference patterns which have a predetermined degree of similarity or above, and the similar reference patterns thus selected are then used for matching with the entire unknown sound.

In accordance with another aspect of the present invention, there is provided a method for identifying a sound, wherein, in advance, the sound data of each of various sounds for a predetermined time interval from the beginning thereof is added to form a single frame of reference pattern and the reference patterns for the various sounds are normalized and then stored in a memory, and, then, when an unknown sound is inputted, this unknown sound is converted into a feature pattern whose front data are added to form a single frame of pattern to be matched in a manner similar to that for forming the reference patterns, whereby the pattern to be matched is compared with the stored reference patterns, thereby selecting those reference patterns which have a predetermined degree of similarity or above, and the similar reference patterns thus selected are then used for matching with the entire unknown sound.

In accordance with a further aspect of the present invention, there is provided a method for identifying a sound, wherein, in advance, the sound data of each of various sounds for a predetermined time interval from the beginning thereof is added to form a single frame of reference pattern and the reference patterns for the various sounds are classified into different types, and, then, when an unknown sound is inputted, this unknown sound is converted into a feature pattern whose front data are added to form a single frame of pattern to be matched in a manner similar to that for forming the reference patterns, whereby the pattern to be matched is first classified as to its type and then the entire pattern of the unknown sound is compared with those reference patterns of the same type to carry out pattern matching.

It is, therefore, a primary object of the present invention to obviate the disadvantages of the prior art as described previously and to provide a novel method and system for identifying a sound.

Another object of the present invention is to provide a novel method and system for recognizing a speech.

A further object of the present invention is to provide a method and system for identifying a voice.

A still further object of the present invention is to provide a high-speed sound recognition method and system capable of finding which of stored sounds matches best with an unknown sound by pattern matching.

Other objects, advantages and novel features of the present invention will become apparent from the following detailed description of the invention when considered in conjunction with the accompanying drawings.

BRIEF DESCRIPTION OF THE DRAWINGS

FIGS. 2 and 3 are block diagrams showing two alternative embodiments of the present invention; and FIGS. 4a through 4c are schematic illustrations which are useful for explaining the principle of the present invention.

DESCRIPTION OF THE PREFERRED EMBODIMENTS

Figure 1:
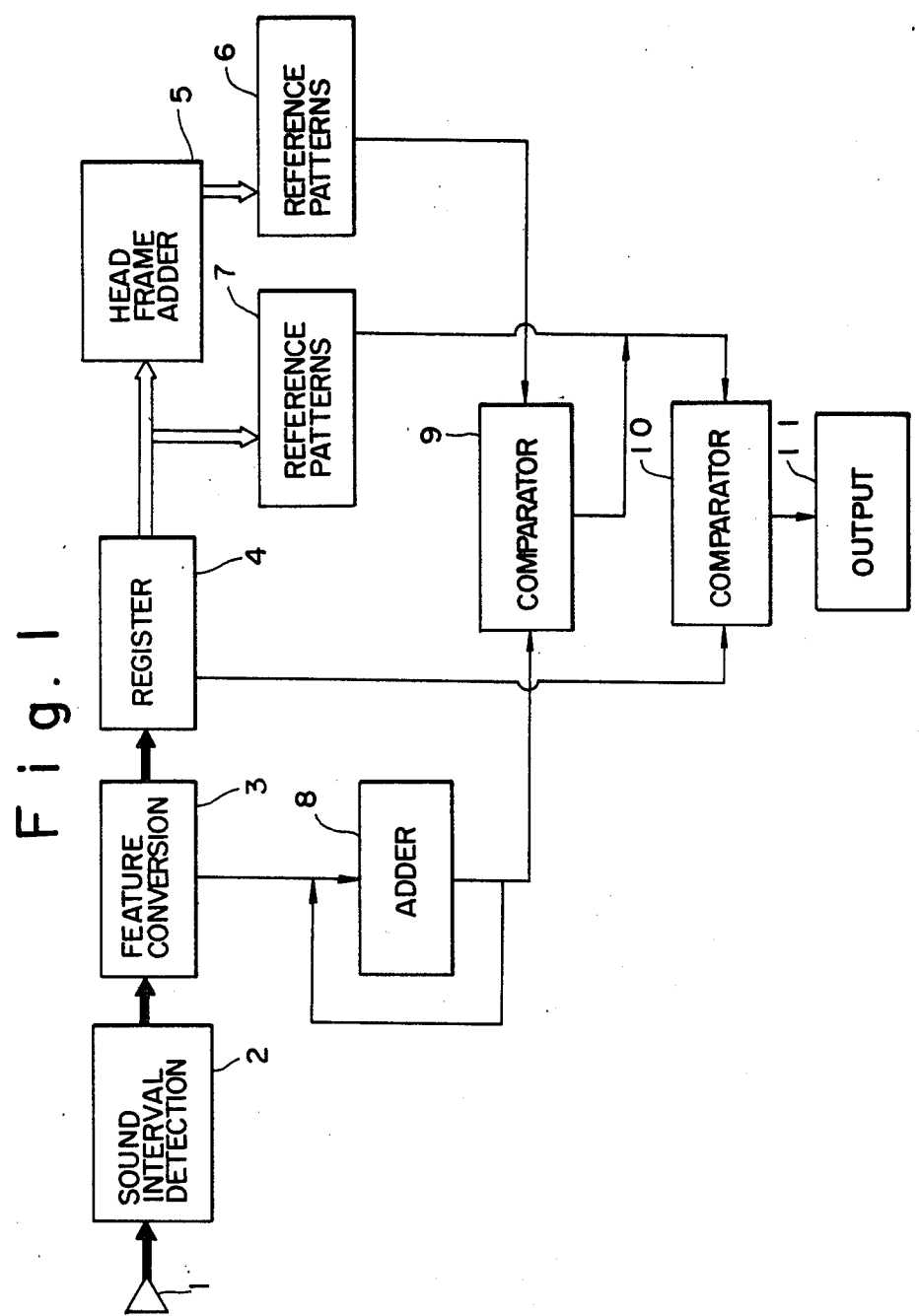
FIG. 1 is a block diagram showing a system of identifying a sound constructed in accordance with one embodiment of the present invention.

Referring now to FIG. 1, there is shown in block form a sound identifying system constructed in accordance with one embodiment of the present invention, which includes a microphone 1 for receiving sound information and converting the sound information into an electrical sound data. A sound interval detection unit 2 is connected to the microphone 1 and it is also connected to a feature conversion unit 3 where the sound data is converted into a feature pattern such as a time-frequency pattern. The feature conversion unit 3 is connected to a register 4 for storing therein the feature pattern temporarily. Connected to the register 4 is a first memory 7 for storing therein full reference patterns, and various reference sound patterns are stored therein when the system is operated in a registration mode. Also connected to the register 4 is a head frame adder 5 which, in turn, is connected to a second memory 6 for storing therein preliminary reference patterns each of which is formed by adding the predetermined number of data from the beginning when the system is operated in the registration mode.

Also provided as connected to the feature conversion unit 3 is an adder 8 which adds a predetermined number of data from the beginning when the system is operating in an identification mode. The adder 8 is connected to a first comparator 9 which is also connected to the second memory 6 of preliminary reference patterns, and, thus, the first comparator compares the added result from the adder 8 with each of the preliminary reference patterns stored in the second memory 6 to select those which have a predetermined level of similarity or above. A second comparator 10 is provided as connected to the register 4, to the first memory of full reference patterns, and to the comparator 9. Thus, based on the selection made by the first comparator 9, the feature pattern currently stored in the register 4 is compared with each of those full reference patterns which correspond to the selected preliminary reference patterns, and the one having the best similarity is outputted to an output unit 11.

As described above, the system of FIG. 1 operates in two modes. That is, in the first place, the system operates in the registration mode, in which the operator inputs various basic sounds, such as words, into the microphone 1 and the various sounds are stored into the first and second memories 7 and 6 in the form of full and preliminary reference patterns. After registering various basic sounds, the system is switched to the identification or recognition mode, in which, when the operator inputs an unknown sound into the microphone 1, the first predetermined number of data is added to define a preliminary reference pattern by the adder 8 and it is compared with the preliminary reference patterns stored in the second memory 6, thereby selecting those full reference patterns having at least a predetermined degree of similarity, and, then, the feature pattern converted from the unknown sound now stored in the register 4 is compared with the selected full reference patterns, thereby outputting the one having the best similarity as an output to the output unit 11. Thus, the fat and white interconnection lines between blocks in the system of FIG. 1 indicates the lines used only during the registration mode; whereas, the narrow interconnection lines between blocks indicate the lines used only during the identification mode. And, the fat and black interconnection lines between blocks indicate the lines commonly used for the registration and identification modes.

In operation, the system of FIG. 1 is first operated in the registration mode. During the registration mode, various sound information to be registered is inputted through the microphone 1 and each of the sounds inputted is converted into a feature pattern. Any desired parameter may be selected as a feature, but, in the illustrated example, the sound data is frequency analyzed, for example, by passing through a filter bank having a predetermined number of channels, each of which has a predetermined frequency range. Thus, the sound data is converted into a time-frequency pattern and local peaks in the frequency analyzed sound data are treated as features of inputted sound data. The feature pattern is formed by sampling the sound data at every 10 milli-seconds and the feature pattern is stored into the register 4. This pattern is then transferred to the first memory 7 and stored therein as it is a full reference pattern.

On the other hand, the first predetermined number of data, or that portion of th feature pattern stored in the register 4 which falls within a predetermined time interval, e.g., approximately 100 milli-seconds, from the beginning of the pattern are added by the head frame adder 5 and this added result is stored into the second memory 6 a a preliminary reference pattern.

FIG. 4a illustrates a portion of the feature pattern or time-frequency pattern stored in the register 4, so that the abscissa indicates frequency and the ordinate indicates time in FIG. 4a. In the example shown in FIG. 4a, there are eight channels, each of which has a unique frequency range corresponding to the frequency range of a bandpass filter used in the feature conversion unit 3. It is to be noted that the top row of pattern shown in FIG. 4a is the beginning and the data develops with time in the downward direction, so that each row represents a set of eight data sampled at a particular point in time. Following the convention in the field of sound recognition, a set of eight data sampled at a particular point in time is called a frame. Thus, each frame has eight data in the time-frequency pattern shown in FIG. 4a. In the present system shown in FIG. 1, it is so structured that each of the adders 5 and 8 adds the first 10 frames of the time-frequency pattern formed at the feature conversion unit 3, thereby forming a single, consolidated frame. Such a single, consolidated frame is illustrated in FIG. 4b. The consolidated frame shown in FIG. 4b is formed by the head frame adder 5 and then stored into the second memory 6 as a preliminary reference pattern. In this manner, the operator pronounces desired basic sounds to be registered one after another against the microphone 1, so that each of the sounds is processed as described above and its preliminary and full reference sounds are stored into the second and first memories 6 and 7, respectively.

Upon completion of the registration mode, the system of FIG. 1 is set in the identification mode. Then, when an unknown sound is pronounced against the microphone 1, it is converted into an electrical sound signal by the microphone 1 and supplied to the sound interval detection unit 2, which detects the beginning of the sound data thus inputted. The sound data is then supplied to the feature conversion unit 3 where the sound data is converted into a time-frequency pattern by sampling the sound data at a predetermined time interval at a predetermined number of bandpass filters (not shown). The time-frequency pattern formed by the feature conversion unit 3 is stored into the register 4 as it is, and, at the same time, the first predetermined portion, or first ten frames, of the time-frequency pattern is also supplied to the adder 8, where the first ten frames are added to form a single, consolidated frame, as shown in FIG. 4b. Upon formation of the single, consolidated frame by the adder 8, it is compared with the preliminary reference patterns stored in the second memory 6 by the first comparator 9, whereby those preliminary reference patterns which have at least a predetermined level of similarity with the frame just formed by the adder 8 are selected. It is to be noted that each of the preliminary reference patterns stored in the second memory 6 is comprised of a single, consolidated frame like the frame just formed by the adder 8, so that the comparison at the first comparator 9 can be carried out extremely at high speed.

Upon completion of selection of the preliminary reference patterns from the second memory 6, the first comparator 9 retains information of the selected preliminary reference patterns. Now, as soon as the feature conversion unit 3 has completed the formation of the time-frequency pattern for the unknown sound thus inputted, the second comparator 10 starts to compare the time-frequency pattern of the unknown sound now stored in the register 4 with the full reference patterns stored in the first memory 7. In this case, however, since the first comparator 9 maintains the information of the selected preliminary reference patterns and is operatively connected to the second comparator 10, the second comparator 10 compares the data stored in the register 4 only with those of the full reference patterns which correspond to the selected preliminary reference patterns, the information of which is now maintained in the first comparator 9. The second comparator 10 compares the pattern of the unknown sound stored in the register 4 with each of those full reference patterns stored in the first memory 7 which correspond to the selected preliminary reference patterns one by one and determines the one having the best similarity, which is supplied to the output unit 11. Any well known method of comparison may be applied to each of the comparators 9 and 10. As described above, in accordance with this embodiment of the present invention, since only frame to frame comparison is made at the first comparator 9 to select a collection of candidates and the comparison is made between the unknown sound data and the collection of selected candidates at the second comparator 10, the identification of the unknown sound may be carried out at an extremely high speed.

Figure 2:
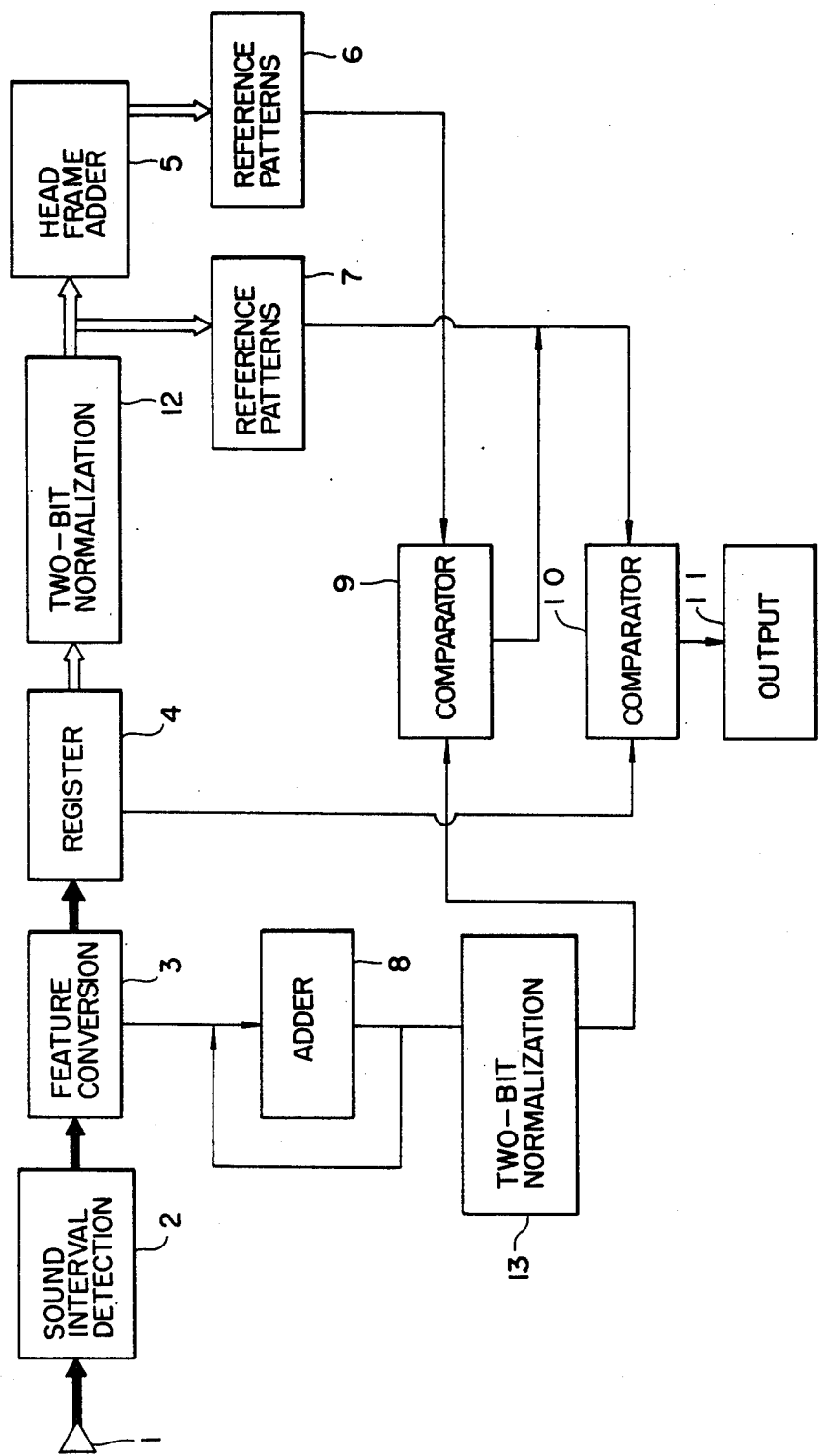

FIG. 2 shows a second embodiment of the present invention and it is in many respects similar in structure to the previously described embodiment, so that identical elements are indicated by identical numerals so as to avoid repetition of description as much as possible. The system of FIG. 2 differs from the system of FIG. 1 in the additional provision of two-bit normalization units 12 and 13. In accordance with this embodiment shown in FIG. 2, during the registration mode, when the first ten frames are added by the head frame adder 5, the two-bit normalization unit 12 is activated to normalize the single, consolidated frame such that each of the consolidated frames has the same peak level. In the present embodiment shown in FIG. 2, when the system operated in the identification mode, the first ten frames of the time-frequency pattern of an unknown sound are added together by the adder 8 to form a single, consolidated frame, which, in turn, is normalized by the two-bit normalization unit 13 before being supplied to the first comparator 9.

With such a structure, the capacity of the second memory 6 may be made smaller. Described more in detail in this respect, in the case where the pattern shown in FIG. 4b is to be stored in the second memory 6, each of the eight elements of the pattern or frame in this case may take any integer number between 1 and 10; on the other hand, in the present embodiment, it is converted into a two-bit representation. That is, the conversion is carried out such that the maximum number 10 is converted to number 3. In the present embodiment, the frame shown in FIG. 4b is converted into a frame shown in FIG. 4c with 0−1 of FIG. 4b being converted to 0, 2-4 to 1, 5-7 to 2, and 8-10 to 3. As s rule of thumb, the capacity required for the second memory 6 may be halved with this technique. It should be noted, further, that the system shown in FIG. 2 is provided with the two-bit conversion unit 13 as interposed between the adder 8 and the first comparator 9; however, this normalization unit 13 may be eliminated if a particular similarity comparison technique is used at the first comparator 9. That is, in the case where the unit 13 is eliminated, the similarity comparison at the first comparator 9 is carried out such that products between the corresponding elements between the two frames to be compared are added and the added result is used for the similarity comparison.

FIG. 3 shows a further embodiment of the present invention, which is also in many respects similar to the embodiment shown in FIG. 1, so that like elements are indicated by like numerals so as to avoid repetition of description as much as possible. The system shown in FIG. 3 differs from the system shown in FIG. 1 in that the second memory 6 and first comparator 9 of the system of FIG. 1 are substituted by classifiers 14 and 15, respectively, in the system of FIG. 3. In accordance with present embodiment, during the registration mode, the first ten frames of the time-frequency pattern of each of basic sounds to be registered are added to define a single, consolidated frame, and the consolidated frames thus defined are stored in the classifier 14 as classified in different types according to a predetermined format. When the system of FIG. 3 operates in the identification mode, if an unknown sound is inputted, the first ten frames of the time-frequency pattern are added by the adder 8 to define a single, consolidated frame and the consolidated frame is classified by the classifier 15 to determine its type. And, then, upon completion of formation of the pattern to be identified in the register 4, the operator 10 compares the pattern to be identified stored in the register 4 only with those reference patterns stored in the memory 7 which are classified in the same type.

One example of classification will be described with reference to FIG. 4b. Assuming that eight channels or eight frequency intervals are designated channels 1 through 8 from left to right in FIG. 4b, the eight channels are divided into 4 blocks, each of which encompasses the adjacent two channels. And, the pattern or frame is classified into one of four different types depending on which of the four blocks has the maximum value. With this structure, no calculation for determining the degree of similarity is required in limiting the number of reference patterns to be used by the comparator 10.

As described above, in accordance with the present invention, the identification of an unknown sound can be carried out extremely at high speed.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for identifying an unknown sound having a registration mode and an identification mode, wherein, during the registration mode, said method comprising the steps of:

forming a time-dependent first pattern from a sound inputted to be registered; and storing said first pattern as a first reference pattern while adding a predetermined portion of said first pattern together to define a second reference pattern and storing said second reference pattern, whereby first and second reference patterns are stored for various sounds to be registered; during the identification mode, said method comprising the steps of:

forming a time-dependent second pattern from an unknown sound inputted to be identified;

adding a predetermined portion of said second pattern together to define a comparison pattern;

comparing said comparison pattern with said stored second reference patterns, thereby selecting those second reference patterns which have at least a predetermined level of similarity with said comparison pattern; and comparing said second pattern with those of said first reference patterns which correspond to the selected second reference patterns to determine which has the best similarity, thereby identifying the unknown sound.

2. The method of claim 1 wherein said time-dependent pattern is a time-frequency pattern which is formed by sampling sound data at a predetermined time interval at a plurality of different frequency intervals, which defines a frame, at the same time.

3. The method of claim 2 wherein each of the steps of adding a predetermined portion adds a predetermined number of first frames in each of the time-dependent patterns.

4. The method of claim 1 wherein said second reference pattern is normalized in a predetermined manner before being stored.

5. The method of claim 4 wherein said comparison pattern is normalized in a predetermined manner before being used at the comparing step.

6. The method of claim 4 wherein said predetermined manner is a two-bit normalization.

7. A method for identifying an unknown sound having a registration mode and an identification mode, wherein, during the registration mode, said method comprising the steps of:

forming a time-dependent first pattern from a sound inputted to be registered; and storing said first pattern as a first reference pattern while adding a predetermined portion of said first pattern together to define a second reference pattern, classifying said second reference pattern into one of predetermined types, and storing the type of said second reference pattern, whereby first reference patterns and types thereof are stored for various sounds to be registered;

during the identification mode, said method comprising the steps of:

forming a time-dependent second pattern from an unknown sound inputted to be identified;

adding a predetermined portion of said second pattern together to define a third pattern;

classifying said third pattern into one of said predetermined types; and comparing said second pattern with those of said first reference patterns which have the same type as that of said third pattern to determine which has the best similarity, thereby identifying the unknown sound.

8. The method of claim 7 wherein said time-dependent pattern is a time-frequency pattern which is formed by sampling sound data at a predetermined time interval at a plurality of different frequency intervals, which defines a frame, at the same time.

9. The method of claim 8 wherein each of the steps of adding a predetermined portion adds a predetermined number of first frames in each of the time-dependent patterns.

* * * * *